Figure 1:
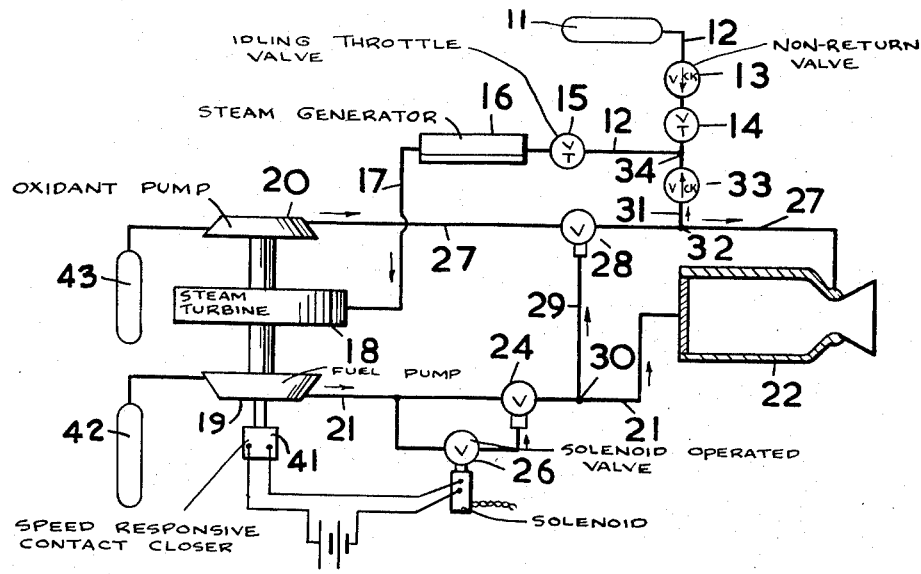

March 19, 1957 W. KRETSCHMER 2,785,532
PROPELLANT SUPPLY SYSTEMS FOR JET REACTION MOTORS
Filed Dec. 11, 1953

INVENTOR
Willi Kretschmer
BY
W. E. Thibodeau + A. W. Dew
ATTORNEYS

United States Patent Office 2,785,532
Patented Mar. 19, 1957

2,785,532

PROPELLANT SUPPLY SYSTEMS FOR JET REACTION MOTORS

Willi Kretschmer, Southcourt, Aylesbury, England, assignor to the Minister of Supply, in Her Majesty's Government of the United Kingdom of Great Britain and Northern Ireland, London, England Application December 11, 1953, Serial No. 397,755

6 Claims. (Cl. 60—35.6)

This invention relates to propellant supply systems for jet reaction motors of the kind in which at least two propellants are supplied under pressure to the motor combustion chamber.

As is well known the relatively high rate of propellant consumption for full thrust running of a jet reaction type motor necessitates the supply of propellants at high pressures. In some cases this is achieved by having associated with the motor and propellant tanks a source of high pressure such as a cylinder of compressed air.

In a propellant supply system for a jet reaction motor of the kind referred to according to the present invention, oxidant is initially supplied under pressure to drive one or more turbines by which in turn two propellant pumps, the one for fuel and the other for oxidant, are driven, whereby fuel is supplied under pressure from the fuel pump to the combustion chamber through a fuel valve which opens under the fuel pump pressure, and, oxidant from an oxidant container is supplied under pressure from the oxidant pump to the combustion chamber through a first oxidant valve which latter is opened by the pressure of the fuel in the fuel pipe line downstream of the fuel valve so that fuel reaches the combustion chamber before oxidant, and, the pressure of oxidant from downstream of the first oxidant valve is used to open a second oxidant valve so that additional oxidant is supplied to drive and increase the speed of the turbine or turbines.

Preferably, oxidant is supplied to a steam generator from which the steam is fed to one or more turbines driving a fuel pump and an oxidant pump, a fuel valve in the supply line from the fuel pump to the combustion chamber opens under the fuel pump pressure, an oxidant valve in the supply line from the oxidant pump to the combustion chamber is opened by the fuel pressure in the fuel supply line downstream of the fuel valve, and, a second oxidant valve is opened by the oxidant pressure in the oxidant supply line downstream of the first oxidant valve to supply additional oxidant to the steam generator.

There may be one source of oxidant under pressure for supplying the steam generator initially on starting and the oxidant may be supplied to the pump from this or from a second, e. g. low pressure, source; and, the additional supply of oxidant to the steam generator may be from the oxidant supply line to the combustion chamber downstream of the first oxidant valve or from a third, e. g. higher pressure, source.

Preferably oxidant in the form of hydrogen peroxide is supplied from an external source to a steam generator from which steam is fed to drive the turbine and also hydrogen peroxide is fed via the open second oxidant valve to the steam generator for full thrust running.

Figure 2:
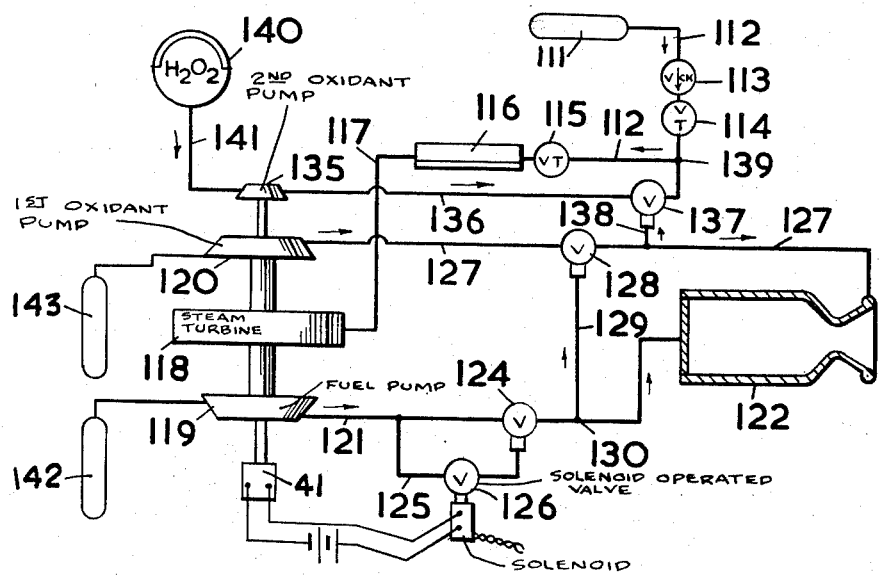

Two propellant systems according to the invention are illustrated by the diagrammatic drawings accompanying the provisional specification of which:

Figure 1 shows a propellant system in which the same type of oxidant in this case hydrogen peroxide supplied to the steam generator is also supplied to the combustion chamber and Figure 2 shows a propellant system in which hydrogen peroxide is supplied to the steam generator and nitric acid is supplied to the combustion chamber.

As shown in Figure 1, hydrogen peroxide oxidant from a pressurised supply container 11 is flowed through a pipe line 12, a non-return valve 13 and idling throttle or restriction 14 and a main throttle or restriction 15 to a known catalytic type steam generator 16, which latter is connected by a pipe line 17 to a steam turbine 18 in driving connection with a fuel pump 19 and an oxidant pump 20. The fuel pump 19 is connected by a pipe line or first conduit 21 to a jet reaction motor combustion chamber 22 via a pressure actuated fuel valve 24; a branch pipe 25 leading from the pipe 21 via a solenoid operated valve 26 to the fuel valve 24. The oxidant pump 20 is connected by a pipe line or second conduit 27 to the chamber 22 via a pressure actuated oxidant valve 28, and the latter is connected by a branch pipe or third conduit 29 to the pipe line 21 at a point 30 downstream of the fuel valve 24. A further branch pipe or fourth conduit 31 leads, from the oxidant pipe line 27 at a point 32 downstream of the oxidant valve 28, through a second oxidant valve 33 of the check valve type to the pipe line 12 at a point 34 intermediate of the idling throttle valve 14 and main throttle valve 15.

In operation, the non-return valve 13 is opened as hydrogen peroxide flows from a container 11 through the pipe 12 via the non-return valve 13, idling throttle 14, which restricts its flow, and main throttle 15 to the steam generator 16. The resulting steam is fed by the pipe 17 to drive the turbine 18 which in turn drives the fuel pump 19 and the oxidant pump 20. When the fuel pump 19 reaches a predetermined speed the solenoid valve 26 is opened by any well-known speed-responsive circuit closer 41 closing a circuit to the solenoid forming a part of valve 26 and fuel is pumped from a container 42 through the pipes 21 and 25. The pressure of fuel in the pipe 25 opens the fuel valve 24 and fuel is fed to the combustion chamber 22. Fuel under pressure downstream of the fuel valve 24 acting through the branch pipe 29 opens the oxidant valve 28 and oxidant (hydrogen peroxide) from a further container 43 is pumped to the combustion chamber 22 at a higher pressure than that from the oxidant container 11. Oxidant under pressure downstream of the oxidant valve 28 is aso fed through the pipe 31 and the second oxidant valve 33 to the pipe line 12 at 34 and hence to the steam generator 16. The pressure of the oxidant from the pipe 31 also acts back through the idling throttle 14 and closes the non-return valve 13 against the relatively low pressure of oxidant from the container 11 and the motor then continues to run independently of the oxidant in container 11.

The system illustrated in Figure 2 is similar in many respects to that described with reference to Figure 1 and from the container 111 up to the junction 130 of Figure 2 the parts indicated by numerals 111—130 therein correspond to those indicated by the numerals 11—30 in Figure 1. The turbine 118, however, is in driving connection with a second oxidant pump 135 which is connected by a pipe line 136 to a hydrogen peroxide valve 137 which is in turn connected to the oxidant pipe or second conduit 127 downstream of the pressure actuated oxidant valve 128 by a branch pipe or fourth conduit 138 and to the hydrogen peroxide pipe 112 at 139. A supply container 140 for hydrogen peroxide is connected by a pipe 141 to the pump 135.

In operation after opening of valve 113, hydrogen peroxide from the supply container 111 is fed to the steam generator 116 and the resulting steam drives the turbine 118 as described with reference to Figure 1. The turbine 118 drives the fuel pump 119, oxidant pump 120 and the second oxidant pump 135. When the speed of the fuel pump 119 reaches a predetermined value of the solenoid operated valve 126 is opened by mechanism similar to that disclosed in connection with Figure 1 and fuel from a container 142 is pumped through the pipes 121 and 125 and the pressure of fuel in the latter opens the pressure actuated fuel valve 124 and fuel is fed to the combustion chamber. Fuel under pressure down-stream of the fuel valve 124 acting through the branch pipe or third conduit 129 opens the oxidant valve 128 and an oxidant, other than hydrogen peroxide, nitric acid for example, from container 143 is pumped to the combustion chamber 122. Oxidant under pressure from downstream of the oxidant valve 128 is also fed through the pipe 138 and opens the pressure actuated hydrogen peroxide valve 137. With the hydrogen peroxide valve 137 open hydrogen peroxide from the container 140 is pumped, by the pump 135, through the pipe 136 and valve 137 to the pipe line 112 at 139 and thence to the steam generator 116. This hydrogen peroxide from the pump 135 is at a higher pressure than that from the container 111 and acting back through the idling throttle valve 114 closes the non-return valve 113 and the motor then continues to run independently of the source of hydrogen peroxide in said container 111.

I claim:

1. In a fuel supply system for a jet reaction motor having a fuel inlet and an oxidant inlet, a source of fuel, a source of oxidant, first and second conduits each connecting one of said sources with a respective inlet, a fuel pump in said first conduit, an oxidant pump in said second conduit, a steam turbine, driving connections between said turbine and said pumps, a steam generator, a pipe supplying steam from said generator to said turbine, a first pressure-opened valve in said first conduit downstream of said fuel pump, means opening said first valve by and in response to a predetermined speed of said fuel pump, a second pressure-opened valve in said second conduit downstream of said oxidant pump, and a third conduit between said first conduit and said second valve downstream of said first valve to open the latter in response to a predetermined fuel pressure.

2. In a fuel supply system as recited in claim 1, said means comprising a by-pass in said first conduit between said fuel pump and said first valve, a solenoid-operated valve in said by-pass, and an energizing circuit for said solenoid-operated valve and including a contact closer responsive to speed of said fuel pump.

3. In a fuel supply system for a jet reaction motor having a fuel inlet and an oxidant inlet, a source of fuel, a source of oxidant, a first conduit connecting said fuel source and fuel inlet and including a first pump and first pressure-operated valve in succession in the direction of flow to said motor, a second conduit connecting said oxidant source and oxidant inlet and including a second pump and second pressure-operated valve in succession in the direction of flow to said motor, a steam turbine, driving connection between said turbine and said pumps, a third conduit connecting said second valve with said first conduit downstream of said first valve, and means opening said first valve by and in response to a predetermined speed of said first pump.

4. A fuel supply system as recited in claim 3, a steam generator, a first pipe connecting said steam generator with said turbine, a second source of oxidant under pressure, a second pipe connecting said second source with said steam generator and including a non-return valve, and a fourth conduit between said oxidant conduit and said second pipe downstream of said second valve, and between said non-return valve and steam generator, and a third valve in and opening said fourth conduit to flow of oxidant from said second source, by and in response to a predetermined pressure rise in said second conduit.

5. A fuel supply system as recited in claim 3, a steam generator, a first pipe connecting said steam generator with said turbine, a second source of oxidant under pressure, a second pipe connecting said second source with said steam generator and including a non-return valve, a third source of oxidant, a third pipe connecting said third source with said second pipe between said steam generator and said non-return valve and including a third pump and third pressure-responsive valve in sequence in the downstream direction of flow in said third pipe, a driving connection between said third pump and turbine, and a fourth conduit connecting said third valve with said second conduit downstream of said second valve, whereby said third pipe is opened to flow of oxidant from said third source to said steam generator by and in response to pressure rise in said second conduit downstream of said second valve.

6. In a fuel supply system for a jet reaction motor having a fuel inlet and an oxidant inlet, a source of fuel, a first conduit connecting said source of fuel and fuel inlet and including a fuel pump and first pressure-opened valve in sequence in the downstream direction of flow in said first conduit, a first source of oxidant, a second conduit connecting said first source of oxidant and oxidant inlet and including an oxidant pump and second pressure-opened valve in sequence in the downstream direction of flow of oxidant in said second conduit, a third conduit connecting said second valve with said first conduit downstream of said first valve to operate said second valve, a steam turbine, a steam generator, a first pipe connecting said steam generator with said turbine, a second source of oxidant under pressure, a second pipe connecting said second source of oxidant with said steam generator and including a check valve, a third source of oxidant, a third pipe connecting said third source with said second pipe between said steam generator and check valve, and including a second oxidant pump and third pressure-opened valve in sequence in the direction of flow in said third pipe, a fourth conduit connected to said third valve to open the same by pressure build-up in said second conduit downstream of said second valve in the direction of flow in said second conduit, and a driving connection between said turbine and said second oxidant pump.

References Cited in the file of this patent

UNITED STATES PATENTS

| | | |
|---|---|---|
| 2,397,657 | Goddard | Apr. 2, 1946 |
| 2,450,950 | Goddard | Oct. 12, 1948 |
| 2,470,564 | Lawrence | May 17, 1949 |
| 2,585,626 | Chilton | Feb. 12, 1952 |
| 2,612,752 | Goddard | Oct. 7, 1952 |
| 2,659,197 | Halford et al. | Nov. 17, 1953 |